(12) United States Patent
Iyer

(10) Patent No.: US 9,444,888 B2
(45) Date of Patent: *Sep. 13, 2016

(54) INITIATING PEER-TO-PEER TUNNELS

(71) Applicant: Aruba Networks, Inc., Sunnyvale, CA (US)

(72) Inventor: Pradeep J Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,352

(22) Filed: Jun. 2, 2014

(65) Prior Publication Data

US 2014/0280733 A1    Sep. 18, 2014

Related U.S. Application Data

(63) Continuation of application No. 12/433,610, filed on Apr. 30, 2009, now Pat. No. 8,032,652, and a continuation of application No. 12/429,981, filed on Apr. 24, 2009, now Pat. No. 9,049,045, and a continuation of application No. 13/233,976, filed on Sep. 15, 2011, now Pat. No. 8,788,700.

(51) Int. Cl.
*G06F 15/16*     (2006.01)
*H04L 29/08*     (2006.01)

(52) U.S. Cl.
CPC ......... *H04L 67/1074* (2013.01); *H04L 67/104* (2013.01); *H04L 67/1042* (2013.01)

(58) Field of Classification Search
CPC ............... H04L 47/24; H04L 12/5692; H04L 2209/80; H04L 41/12; H04L 45/122; H04L 47/125; H04W 8/082; H04W 8/085; H04W 4/12; H04W 64/00

USPC ........................ 709/235, 219, 236, 239, 227; 710/52–57; 370/389, 412–418; 711/118–146

See application file for complete search history.

(56) References Cited

U.S. PATENT DOCUMENTS

| | | | |
|---|---|---|---|
| 6,076,168 | A  | 6/2000  | Fiveash et al. |
| 6,580,704 | B1 | 6/2003  | Wellig et al. |
| 7,130,921 | B2 | 10/2006 | Goodman et al. |
| 7,206,859 | B2 | 4/2007  | Narayanan et al. |
| 7,328,280 | B2 | 2/2008  | Takeda et al. |

(Continued)

OTHER PUBLICATIONS

Dommety, G., "Key and Sequence Number Extensions to GRE", Network Working Group, Request for Comments: 2890, Standards Track, Cisco Systems, Sep. 2000, pp. 1-7.

(Continued)

*Primary Examiner* — Ruolei Zong
(74) *Attorney, Agent, or Firm* — Brooks, Cameron & Huebsch, PLLC

(57) ABSTRACT

Initiating peer-to-peer tunnels between clients in a mobility domain. Client traffic in a mobility domain normally passes from the initiating client to an access node, and from the access node through a tunnel to a controller, and then through another tunnel from the controller to the destination access node, and the destination client. When initiated by the controller, the access nodes establish a peer-to-peer tunnel for suitable client traffic, bypassing the "slow" tunnels through the controller with a "fast" peer-to-peer tunnel. Traffic through this "fast" tunnel may be initiated once the tunnel is established, or traffic for the "fast" tunnel may be queued up until traffic has completed passing through the "slow" tunnel.

18 Claims, 4 Drawing Sheets

(56) References Cited

U.S. PATENT DOCUMENTS

| | | |
|---|---|---|
| 7,616,613 B2 | 11/2009 | Sanzgiri et al. |
| 7,639,681 B2 | 12/2009 | Kelly et al. |
| 7,852,767 B2 | 12/2010 | Twiss |
| 8,032,652 B2 | 10/2011 | Iyer |
| 8,085,793 B2 | 12/2011 | Krishnan et al. |
| RE43,127 E | 1/2012 | Wentink |
| 8,499,095 B1 * | 7/2013 | Sullenberger et al. ....... 709/238 |
| 2004/0185777 A1 | 9/2004 | Bryson |
| 2006/0018291 A1 | 1/2006 | Patel et al. |
| 2006/0190719 A1 | 8/2006 | Rao et al. |
| 2007/0008922 A1 | 1/2007 | Abhishek et al. |
| 2007/0025355 A1 | 2/2007 | Cohen et al. |
| 2007/0064605 A1 | 3/2007 | Ho et al. |
| 2007/0104138 A1 | 5/2007 | Rudolf et al. |
| 2007/0157303 A1 | 7/2007 | Pankratov |
| 2007/0253371 A1 | 11/2007 | Harper et al. |
| 2008/0181113 A1 | 7/2008 | Narayanan et al. |
| 2008/0291846 A1 | 11/2008 | Lu |
| 2009/0080441 A1 | 3/2009 | Krishnan et al. |
| 2009/0316687 A1 | 12/2009 | Kruppa |
| 2010/0067446 A1 | 3/2010 | Oulai et al. |
| 2010/0220738 A1 | 9/2010 | Sarikaya |
| 2010/0315992 A1 * | 12/2010 | Turanyi ........................ 370/315 |

OTHER PUBLICATIONS

Farinacci et al., "Generic Routing Encapsulation (GRE)", Network Working Group, Request for Comments: 2784, Standards Track, Mar. 2000, pp. 1-9.

Hanks et al., "Generic Routing Encapsulation (GRE)", Network Working Group, Request for Comments: 1701, Informational, Oct. 1994, pp. 1-8.

Hanks et al., "Generic Routing Encapsulation Over IPv4 Networks", Network Working Group, Request for Comments: 1702, Informational, Oct. 1994, pp. 1-4.

* cited by examiner

INITIATING PEER-TO-PEER TUNNELS

BENEFIT CLAIM; INCORPORATION BY REFERENCE: RELATED APPLICATIONS

The present application is a continuation of U.S. application Ser. No. 13/233,976 filed on Sep. 15, 2011, which is a continuation of U.S. application Ser. No. 12/433,610, filed on Apr. 30, 2009. The present application is related to U.S. patent application Ser. No. 12/429,981 filed on Apr. 24, 2009. All of the aforementioned patent applications are hereby incorporated by reference.

The applicant(s) hereby rescind any disclaimer of claim scope in the parent application(s) or the prosecution history thereof and advice the USPTO that the claims in this application may be broader than any claim in the parent application(s).

BACKGROUND OF THE INVENTION

The present invention relates to digital networks, and in particular, to the problem of initiating traffic in peer-to-peer tunnels in switched digital systems.

Modern digital networks operating under IEEE 803.2 and 802.11 standards are called upon to support a wide range of wired and wireless clients.

Traffic between clients in a mobility domain typically passes from the originating client to an access node, and then from the access node to a controller through a tunnel. The traffic then passes through another tunnel from the controller to the destination access node, and to the destination client. Traffic passing through the controller may be subject to firewalling, deep packet inspection, authentication, and similar processes.

These processes, and the trip from one access node to another through the controller take time, particularly when the controller and the access nodes may not reside in the same building, or even the same general locale. Properly authenticated traffic may be eligible for peer-to-peer forwarding. In peer-to-peer forwarding, as described in U.S. patent application Ser. No. 12/429,981 titled "Peer-to-Peer Forwarding for Packet-Switched Traffic" filed Apr. 24, 2009, and incorporated by reference herein, a tunnel is established between the two access nodes, and traffic sent through this peer-to-peer tunnel.

Visualizing the peer-to-peer tunnel as a short, fast pipe, and the controller-terminated tunnels as a long, slow pipe, the transition of traffic from the slow pipe to the fast pipe may result in issues such as out-of-order arrival of packets, with fast pipe packets arriving at the destination before packets already in the slow pipe. While some applications may not be affected by such out-of-order arrival, other applications such as multimedia are affected, resulting in, for example, stuttered or dropped audio and/or video.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of initiating tunneling traffic in a digital network. A digital network has one or more central controllers to which a plurality of access nodes are connected. Each access node provides a combination of wireless and/or wired access to resources available through the central controller. The access nodes may be directly connected to the controller, or they may connect to the controller through routed networks such as a corporate Intranet, wider Internet, through private networks such as VPNs, or through a combination of wired and wireless backhaul.

In operation, the access nodes establish communications with the controller using tunnels. An example of a tunnel is a GRE tunnel. Traffic to and from clients connected to an access node is routed through the tunnel and through the central controller to which the access node is connected.

A mobility controller process runs in the controller, monitoring traffic to and from clients. The set of access nodes known to the controller and other associated controllers is defined as the mobility domain. When the mobility controller recognizes that traffic is being sent from a first client in the mobility domain to a second client in the mobility domain, the mobility controller evaluates whether the traffic is eligible for peer-to-peer forwarding. If the traffic is eligible for per-to-peer forwarding, the mobility manager instructs the access node to which the first client is connected to establish a peer-to-peer tunnel to the access node to which the second client is connected, and to direct the traffic through the peer-to-peer tunnel.

In accordance with the invention, traffic through the peer-to-peer tunnel may begin flowing as soon as the peer-to-peer ("fast") tunnel is established, or traffic in one or both directions through the tunnel may be queued until traffic flowing through the controller-terminated ("slow") tunnels has completed.

Completion of slow traffic through the controller-terminated tunnels may be sensed in a number of ways. Slow tunnel traffic may be timed out, and queued traffic released after a preset time since the last packet was sent through the slow tunnel. The identity of the last packet sent through the slow tunnel may be retained, and queued traffic released when an acknowledgement for that packet is received. A special packet may be sent through the slow tunnel and queued traffic released when an acknowledgement for that packet is received.

Figure 1:
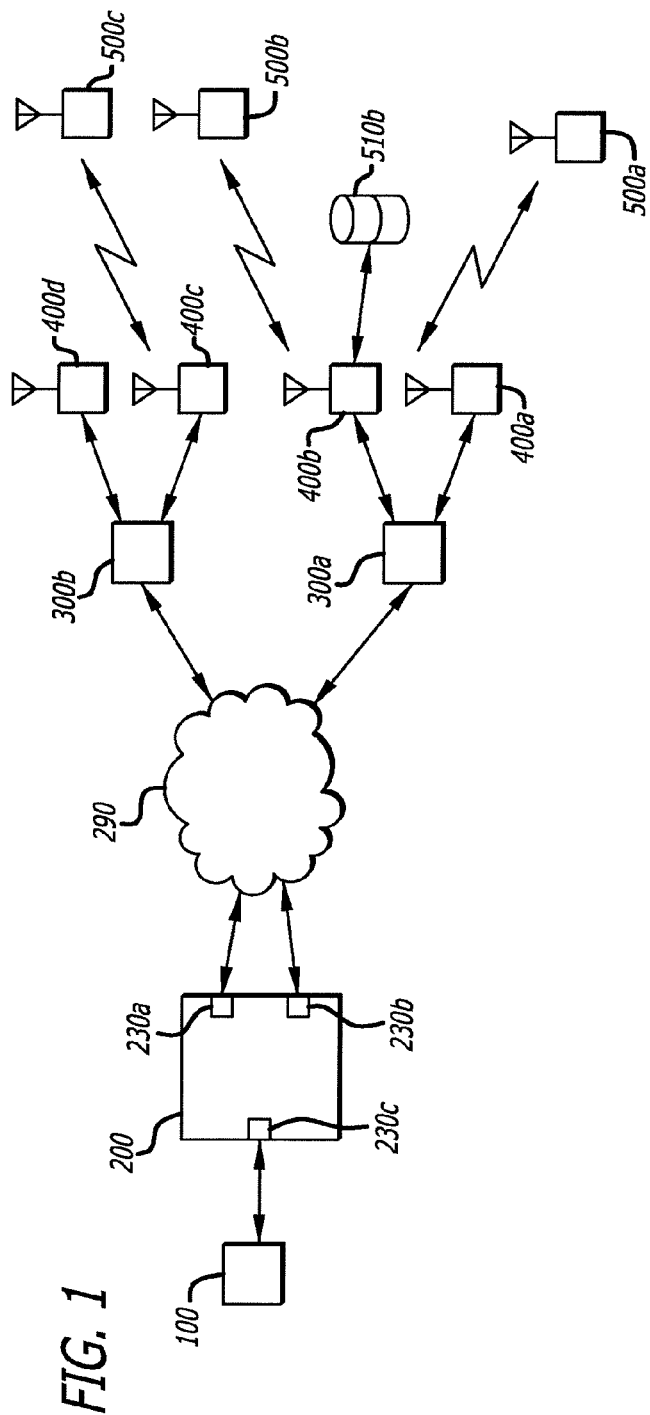
FIG. 1 shows a network.

FIG. 1 shows a digital network. Router 100 connects to a network, not shown. Router 100 also provides services to controller 200. Controller 200 has a plurality of ports, 230*a*, 230*b* for supporting devices such as access nodes 400*a*, 400*b*, 400*c*, 400*d*.

As shown in FIG. 1, these ports 120*a*, 120*b* connect through switched network 290 to routers 300*a* and 300*b*.

Access nodes 400*a*, 400*b*, 400*c*, 400*d* provide wireless and possibly wired services to clients. As shown in FIG. 1, wireless client 500*a* is connected to access node 400*a*. Access node 400*b* supports wireless client 500*b* and wired client 510*b*. Access node supports wireless client 500*c*.

Figure 2:
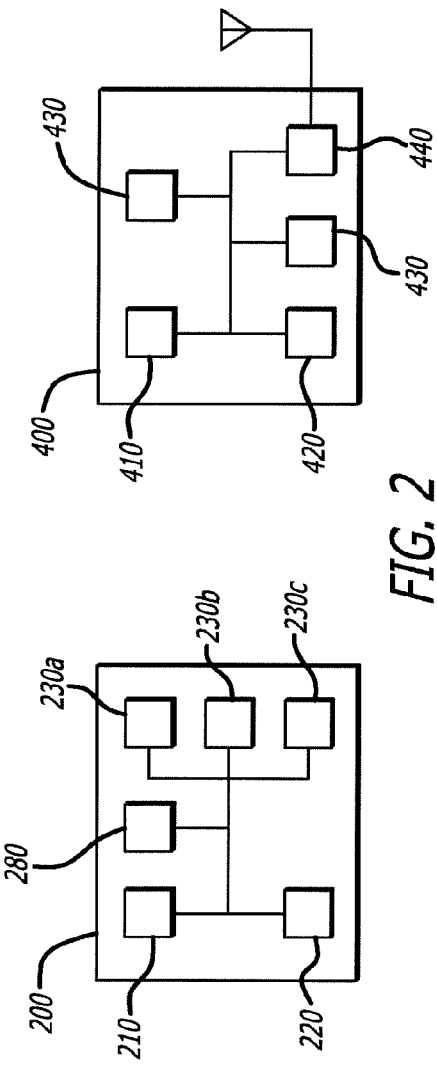
FIG. 2 shows details of network devices.

As shown in FIG. 2, controllers 200 are a purpose-built digital devices having a CPU 210, memory hierarchy 220, and a plurality of network interfaces 230. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230 are typically IEEE 802.3

Ethernet interfaces to copper, although high-speed optical fiber interfaces may also be used. Controller 200 typically operates under the control of purpose-built embedded software, typically running under a Linux operating system, or an operating system for embedded devices such as VXWorks. Controller 200 may have dedicated hardware for encryption, and/or for routing packets between network interfaces 230.

Similarly, as understood by the art, access nodes 400a, 400b, 400c and 400d, are also purpose-built digital devices. These access nodes include CPU 410, memory hierarchy 420, wired interface 430, and wireless interface 440. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access nodes 300 typically operate under control of purpose-built programs running on an embedded operating system such as Linux or VXWorks. Wireless interface 340 is typically an interface operating to the family of IEEE 802.11 standards including but not limited to 802.11a, b, g, and/or n. Multiple wired interfaces 430 may be provided, with one wired interface 430a being used to connect the access node to its controller, and the other wired interfaces 430b used to host wired devices as clients. While wired interfaces such as 802.3 Ethernet may be used, USB may also be used to support printers, mass storage devices, and wireless back-haul links such as 3G or WiMAX modems.

While FIGS. 1 and 2 depict a wired backhaul connecting access nodes 400 to controller 200, a combination of wired and wireless backhauls may also be used, for example, using WiMAX, 3G, or other high-speed wireless connections. While a wired connection to a modem such as an ADSL modem or a cable modem may be used, such a modem may also be built into access node 400.

Routers 300 are also purpose-built digital devices, and similar to controller 200, they contain a CPU, memory hierarchy, and a plurality of interfaces. Routers typically run dedicated software devoted to the tasks required. Routers are commercially available from a number of companies such as Cisco-Linksys, Hewlett Packard, D-Link, and others.

Wireless clients 500 are also digital devices, similarly having CPU 510, memory hierarchy 520, wireless interface 530, and I/O devices 540. As examples, wireless device 500 may be a general purpose computer such as a laptop, or may be a purpose-built device such as a Wi-Fi phone or a handheld scanner. In a general-purpose computer, CPU 510 may be a processor from companies such as Intel, AMD, Freescale, or the like. In the case of purpose-built devices, Acorn or MIPS class processors may be preferred. Memory hierarchy 520 comprises the similar set of read-only memory for device startup and initialization, fast read-write memory for device operation and holding programs and data during execution, and permanent bulk file storage using devices such as flash, compact flash, and/or hard disks. Additional I/O devices 540 may be present, such as keyboards, displays, speakers, barcode scanners, and the like.

Figure 3:
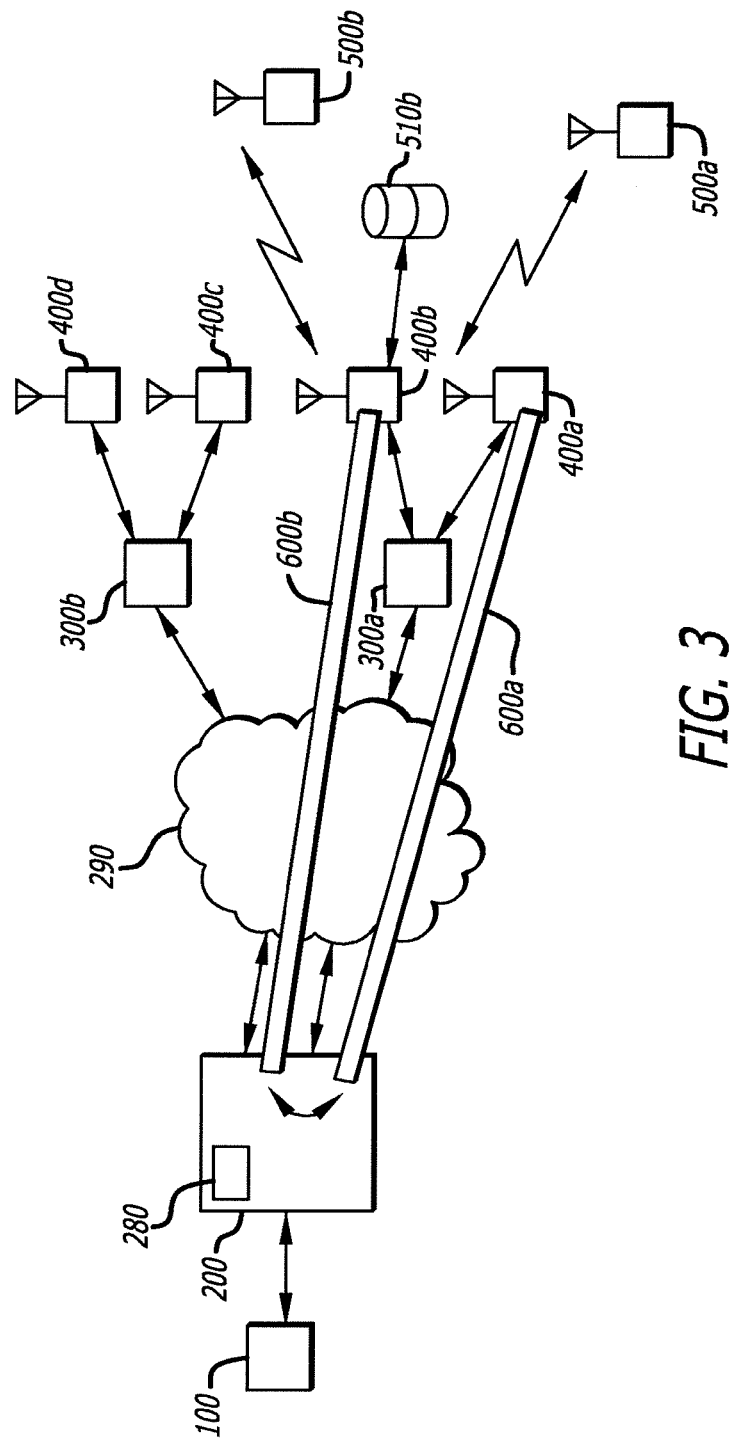
FIG. 3 shows tunnels in a network.

In operation and as shown in FIG. 3, access nodes 400a, 400b, 400c, 400d establish communications with controller 200, in the case of FIG. 3, through routers 300 and switched network 200. As shown for access nodes 400a and 400b, tunnels 600a, 600b such as GRE tunnels are established between the access node and controller 200. Such tunnels 600a, 600b may be established on a per-access node basis, or on a per network basis, with one tunnel established for each advertised wireless network (BSSD) or one tunnel established for each wired port on an access node.

Assume wireless client 500a is connected to access node 400a, and client 500b is connected to access node 400b. When client 500a establishes a connection to client 500b, traffic from client 500a passes through access node 400a, tunnel 600a, to controller 200. Controller 200 identifies the traffic destination as client 500b, and sends the traffic though tunnel 600b to access node 400b and client 500b.

This routing is performed by controller 200 using the IP addresses of clients 500a and 500b, as well as the MAC (media access controller) addresses of clients 500a, 500b and access nodes 400a and 400b. When client 500a wishes to send data to client 500b, it in essence forms an IP packet with client 500b's IP address as the destination, and with client 500a's IP address and MAC address as the source. This information is encapsulated and sent to controller 200.

Controller 200 keeps tables of all access nodes it controls, and all clients associated with those nodes, including IP and MAC addresses. In this way, when it examines the packet from client 500a, it can determine that client 500b, the destination, is connected to access node 400b, and direct the traffic through tunnel 600b to that access point, and the destination device.

Even if clients 500a and 500b are sitting in the same office suite, ten meters apart, traffic between them is routed through controller 200.

Mobility manager 280 is a process running in controller 200. By accessing controller 200's tables of access nodes and their clients, mobility manager 280 can detect when a client is exchanging data with another client in its mobility domain.

Figure 4:
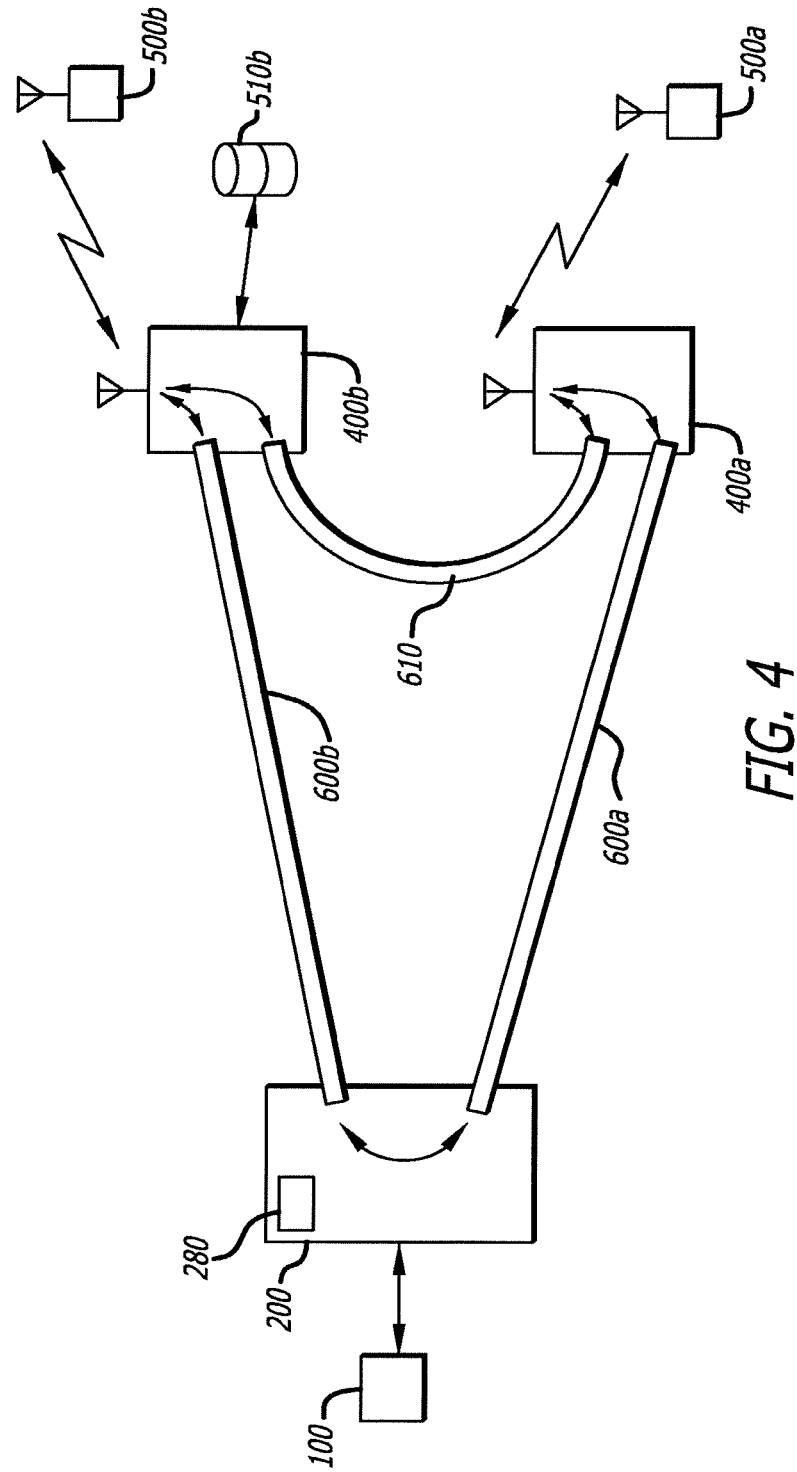
FIG. 4 shows an additional network.

As shown in FIG. 4, when mobility manager 280 detects that client 500a is communicating with client 500b, also in the mobility domain of controller 200, mobility manager 280 evaluates if this traffic is eligible for peer-to-peer forwarding. If the traffic is eligible for peer-to-peer forwarding, mobility manager 280 instructs access node 400a to establish peer-to-peer tunnel 610 between access node 400a and access 400b, and to route that traffic between clients 500a and 500b through tunnel 610 rather than through tunnel 600a. While the peer-to-peer tunnel is being established, traffic between clients flows through the controller. In this manner traffic between clients 500a and 500b rather than traveling through tunnels 600a and 600b and controller 200, instead travels through tunnel 610 once the tunnel is established.

A peer-to-peer tunnel may be established any time mobility manager 280 detects connections and data exchanges between clients in its mobility domain. Or, peer-to-peer tunnels may be evaluated and only established on an authenticated basis according to pre-established rules. Peer-to-peer tunnels may be limited by client identity, including but not limited to client IP address, client MAC address, client authentication, and the like, destination identity, port, traffic type, and so on. As an example, assume a high-speed printer is connected as a client to access node 400a. Appropriate rules for the establishment of peer-to-peer tunnels for a printer would be limited to ports and protocols needed for printer use for local authorized users, with no access allowed for guests. Similarly, traffic to e-mail servers would not be eligible for peer-to-per forwarding, so that such traffic would always pass through controller 280 and be subject to firewalling, virus detection, deep packet inspection, and the like. As another example, network time protocol traffic on port 123 would be eligible for peer-to-peer forwarding to reduce transit delays for time data.

It should be understood that which end of the traffic causes the tunnel to be established is immaterial. As an example, consider a user sending queries to a remote database server. It does not matter if the traffic triggering the formation of a peer-to-peer tunnel is the transmission of a query from the client to the database server, or the transmission of the query result from the database server to the client.

Peer-to-peer tunnels may be established on a session basis, or may be aged. As an example, for a device such as a high-speed printer, a peer-to-peer tunnel with a timeout of thirty seconds may be appropriate; if no activity passes through the tunnel for that predetermined period of time, the tunnel is discontinued. If bursts of traffic between two clients exceed the time-out period, the peer-to-peer tunnel will be discontinued, but the next traffic between the clients, which will once more be routed through controller 200, causes the peer-to-peer tunnel to be re-established.

Assume as an example file/database server 510b is connected via a wired connection to access node 400b. Peer-to-peer tunnels may be permitted for authorized users of the database for the specific protocols and ports used for database access, with all other traffic routed through controller 200 for filtering, firewalling, and authentication. As an example, while database traffic using port 3306 between server 510b and client 500a may be routed through a peer-to-peer tunnel 610, traffic on port 80 between client 500a and server 510b is still routed initially through controller 200.

When multiple controllers 200 are present within a mobility domain, mobility managers 280 operating in each controller may cooperate in supporting peer-to-peer tunneling within the mobility domain. In one embodiment, a mobility manager 280 broadcasts updates of connected clients to other mobility managers in the mobility domain. These updates may be made on a periodic basis, may be event-driven, such as on client connection or disconnection, or on a combination. By providing the ability for a mobility manager to identify clients attached to a different controller that are still within the mobility domain, peer-to-peer forwarding may be extended to cross controller boundaries.

In another embodiment involving multiple controllers, mobility managers 280 may send queries to other mobility managers within the domain to inquire if a destination is a client of another mobility manager within the mobility domain. It may be useful in some embodiments to apply additional authentication when controller boundaries are crossed. As an example, consider an enterprise network spread over many locations, perhaps over many time zones. While establishing a peer-to-peer tunnel between a streaming media device such as a security webcam and a monitoring station offloads that streaming traffic from passing through the controller, other policies may wish to restrict access to such cameras to only users connected to the controller at the particular site, not allowing access across controller boundaries, or only allowing access across controller boundaries to certain classes of users.

Assume for example that client 500a of FIG. 4 is receiving a video stream from a wireless camera 500b. Initially this traffic will be routed through controller 200 via tunnels 600b and 600a. Assuming this traffic is eligible for per-to-peer forwarding, tunnel 610 is established for this traffic between wireless camera 500b and client 500a.

Visualizing tunnels 600b and 600a as a slow pipe, and tunnel 610 as a fast pipe, fast pipe traffic from camera 500b could arrive at destination 500a while a large number of packets from camera 500b are still in the slow pipe. These packets from the slow pipe will continue to arrive at destination 500a, even though subsequent packets have already arrived. Many video clients respond to this out-of-order arrival by dropping the old, out-of-order packets, which can result in stuttered or jittery images.

For other types of traffic, for example the retrieval of large amounts of data from a database, out-of-order delivery may not be an issue.

According to the invention, peer-to-peer tunnel traffic may begin as soon as the tunnel is established, or traffic for the peer-to-peer tunnel may be queued until traffic has completed flowing through the controller-terminated "slow" tunnel. This queue and release model may be applied bidirectionally or unidirectionally.

Figure 5:
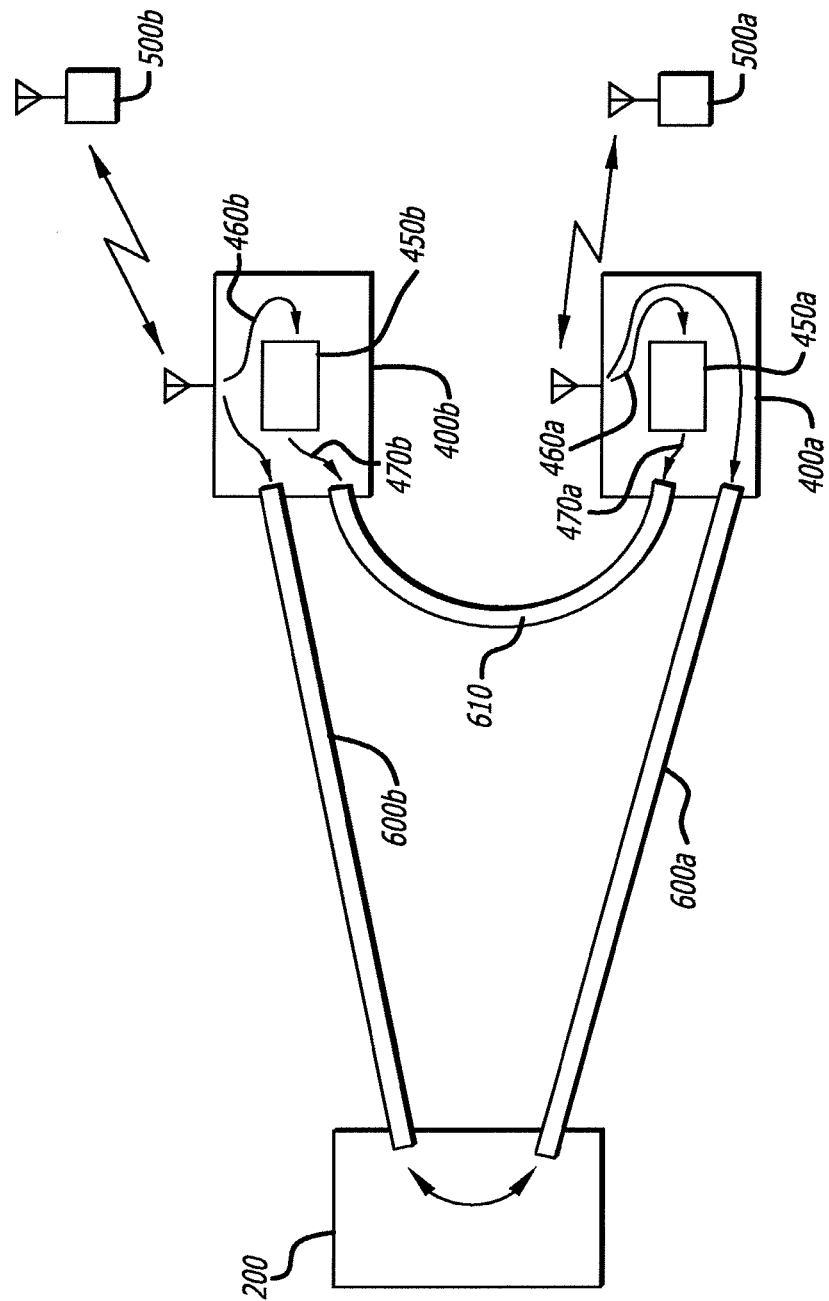
FIG. 5 shows queued startup in a network.

As shown in FIG. 5, if queuing is indicated, packets for the peer-to-peer tunnel are placed 460 in a queue 450 in the access node. This queue is released, and packets sent 470 through the peer-to-peer tunnel in a first-in-first-out fashion once traffic through the slow tunnel, in this example 600b and 600a, has completed.

According to the invention there are a number of ways to determine that all traffic sent through the slow tunnel (tunnels 600b 600a) has arrived.

A special packet may be sent through the slow tunnel; the queue is release when an ACK is received from the destination, indicating the special packet has arrived.

The identification of the last packet sent through the slow tunnel may be kept, and the queue released when an ACK is received from the destination indicating that this packet has arrived.

A timer may be used, releasing the queue after a predetermined amount of time since the last packet was sent through the slow tunnel has elapsed. The value of this timer may be set by controller 200, or it may be set by the access node. As an example, the access node may track the time the last packet was sent, and the time between sending a packet through the slow tunnel and the arrival of an ACK from the destination, and use a value based on such transit times.

A combination of these approaches may also be used. The timer approach provides a useful backup mechanism in the event a marked packet is lost in transit.

It should be noted that low-level responses such as ACKs are not queued, and once the peer-to-peer tunnel is established, these packets may be sent through the peer-to-peer tunnel, even if queueing is in effect.

Such queueing may be bidirectional, or unidirectional. In the case of a client receiving a video stream from a monitoring camera, an essentially one-way flow of data, a unidirectional approach is adequate. In the case of a video or audio conferencing connection, for example, with audio and possibly video streams in both directions, bidirectional queuing is appropriate.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A non-transitory Computer Readable Medium (CRM) comprising instruction which, when executed by one or more hardware processors, causes the one or more hardware processors to:

forward, at a network device on a first communication path between a first network node and a second network node, a data traffic from (i) a first client communicatively coupled with the first network node toward (ii) a second client communicatively coupled with the second network node;
determine whether the data traffic is eligible for peer-to-peer forwarding between the first network node and the second network node;
in response to a determination that the data traffic is eligible for peer-to-peer forwarding, instruct only one of the first network node and the second network node to establish a second communication path that does not include the network device, for transmitting the data traffic between the first network node and the second network node; and
in response to a determination that the data traffic is not eligible for peer-to-peer forwarding, continue to forward the network traffic through the first communication path.

2. The CRM of claim 1, wherein to determine whether the data traffic is eligible for peer-to-peer forwarding, the instructions are further to cause the one or more hardware processors to determine whether the first network node and the second network node are associated with the network device.

3. The CRM of claim 2, wherein the network device is a controller of both the first network node and the second network node.

4. The CRM of claim 1, wherein to determine whether the data traffic is eligible for peer-to-peer forwarding, the instructions are further to cause the one or more hardware processors to determine whether the first network node is associated with a first controller in a particular set of controllers and that the second network node is associated with a second controller of the same particular set of controllers.

5. The CRM of claim 1, wherein to determine whether the data traffic is eligible for peer-to-peer forwarding, the instructions are further to cause the one or more hardware processor to determine whether the data traffic is eligible for peer-to-peer forwarding based on one or more characteristics associated with the data traffic.

6. The CRM of claim 1, wherein said network device is a controller associated with the first network node, wherein a second network device is a controller associated with the second network node, and wherein to instruct only one of the first network node and the second network node to establish the second communication path, the instructions are further to cause the one or more hardware processors to instruct only one of the first network node and the second network node to establish the second communication path, wherein the second communication path also does not include the second network device.

7. A network device comprising:
a hardware processor;
a memory on which is store instructions to cause the hardware processor to:
forward, at the network device on a first communication path between a first network node and a second network node that includes the network device, a data traffic from (i) a first client communicatively coupled with the first network node toward (ii) a second client communicatively coupled with the second network node;
determine whether the data traffic is eligible for peer-to-peer forwarding between the first network node and the second network node;
in response to a determination that the data traffic is eligible for peer-to-peer forwarding, instruct only one of the first network node and the second network node to establish a second communication path that does not include the network device, for transmitting the data traffic between the first network node and the second network node; and
in response to a determination that the data traffic is not eligible for peer-to-peer forwarding, continuing to forward the network traffic through the first communication path.

8. The system of claim 7, wherein to determine whether the data traffic is eligible for peer-to-peer forwarding, the instructions are further to cause the hardware processor to determine whether the first network node and the second network node are associated with the same network device.

9. The system of claim 8, wherein the network device is a controller of both the first network node and the second network node.

10. The system of claim 7, wherein to determine whether the data traffic is eligible for peer-to-peer forwarding, the instructions are further to cause the hardware processor to determine whether the first network node is associated with a first controller in a particular set of controllers and that the second network node is associated with a second controller of the same particular set of controllers.

11. The system of claim 7, wherein to determine whether the data traffic is eligible for peer-to-peer forwarding, the instructions are further to cause the hardware processor to determine whether the data traffic is eligible for peer-to-peer forwarding based on one or more characteristics associated with the data traffic.

12. The system of claim 7, wherein said network device is a controller associated with the first network node, wherein a second network device is a controller associated with the second network node, and wherein to instruct only one of the first network node and the second network node to establish the second communication path, the instructions are further to cause the one or more hardware processors to instruct only one of the first network node and the second network node to establish the second communication path, wherein the second communication path also does not include the second network device.

13. A method comprising:
forwarding, at the network device on a first communication path between a first network node and a second network node that includes the network device, a data traffic from (i) a first client communicatively coupled with the first network node toward (ii) a second client communicatively coupled with the second network node, wherein the first network device comprises a hardware processor;
determining, by the hardware processor, whether the data traffic is eligible for peer-to-peer forwarding between the first network node and the second network node;
in response to a determination that the data traffic is eligible for peer-to-peer forwarding, instructing, by the hardware processor, only one of the first network node and the second network node to establish a second communication path that does not include the network device, for transmitting the data traffic between the first network node and the second network node; and
in response to a determination that the data traffic is not eligible for peer-to-peer forwarding, continue forwarding the network traffic through the first communication path.

14. The method of claim 13, wherein determining whether the data traffic is eligible for peer-to-peer forwarding further comprises determining whether the first network node and the second network node are associated with the network device.

15. The method of claim 14, wherein the network device is a controller of both the first network node and the second network node.

16. The method of claim 13, wherein determining whether the data traffic is eligible for peer-to-peer forwarding further comprises determining whether the first network node is associated with a first controller in a particular set of controllers and that the second network node is associated with a second controller of the same particular set of controllers.

17. The method of claim 13, wherein determining whether the data traffic is eligible for peer-to-peer forwarding further comprises determining whether the data traffic is eligible for peer-to-peer forwarding based on one or more characteristics associated with the data traffic.

18. The method of claim 13, wherein said network device is a controller associated with the first network node, wherein a second network device is a controller associated with the second network node, and wherein instruction only one of the first network node and the second network node to establish the second communication path further comprises instruction only one of the first network node and the second network node to establish the second communication path, wherein the second communication path also does not include the second network device.

* * * * *